US007747438B2

(12) United States Patent
Nguyen et al.

(10) Patent No.: US 7,747,438 B2
(45) **Date of Patent: *Jun. 29, 2010**

(54) MULTI-SLOT DIALOG SYSTEMS AND METHODS

(75) Inventors: Patrick T. M. Nguyen, Alameda, CA (US); Jesus Lopez-Amaro, Alameda, CA (US); Amit V. Desai, Oakland, CA (US); Adeeb W. M. Shana'a, Alameda, CA (US)

(73) Assignee: Voxify, Inc., Alameda, CA (US)

( * ) Notice: Subject to any disclaimer, the term of this patent is extended or adjusted under 35 U.S.C. 154(b) by 542 days.

This patent is subject to a terminal disclaimer.

(21) Appl. No.: 11/787,763

(22) Filed: Apr. 17, 2007

(65) Prior Publication Data

US 2007/0255566 A1 Nov. 1, 2007

Related U.S. Application Data

(62) Division of application No. 10/885,934, filed on Jul. 6, 2004, now Pat. No. 7,228,278.

(51) Int. Cl.
*G10L 15/18* (2006.01)

(52) U.S. Cl. ....................... 704/257; 704/231; 704/270; 704/270.1; 704/275

(58) Field of Classification Search ................. 704/275, 704/257, 231, 270, 270.1
See application file for complete search history.

(56) References Cited

U.S. PATENT DOCUMENTS

| | | | | |
|---|---|---|---|---|
| 4,914,590 | A * | 4/1990 | Loatman et al. | 704/8 |
| 6,173,266 | B1 * | 1/2001 | Marx et al. | 704/270 |
| 6,314,402 | B1 * | 11/2001 | Monaco et al. | 704/275 |
| 6,598,018 | B1 * | 7/2003 | Junqua | 704/251 |
| 2002/0038213 | A1 | 3/2002 | Adachi | |
| 2002/0128821 | A1 * | 9/2002 | Ehsani et al. | 704/10 |
| 2003/0130849 | A1 * | 7/2003 | Durston et al. | 704/270 |
| 2003/0191648 | A1 | 10/2003 | Knott et al. | |
| 2004/0085162 | A1 | 5/2004 | Agarwal et al. | |
| 2006/0025997 | A1 * | 2/2006 | Law et al. | 704/257 |

FOREIGN PATENT DOCUMENTS

| | | | |
|---|---|---|---|
| EP | 1 255 190 | A1 | 11/2002 |

* cited by examiner

*Primary Examiner*—Qi Han
(74) *Attorney, Agent, or Firm*—Orrick, Herrington & Sutcliffe, LLP

(57) ABSTRACT

Systems and methods for constructing a series of interactions with a user to collect multiple pieces of related information for the purpose of accomplishing a specific goal or topic (a multi-slot dialog) using a component-based approach are disclosed. The method generally includes outputting a primary header prompt to elicit values for slots in a segment from the user, receiving a primary user response containing a value for each slot in at least a subset of the slots in the segment, processing the primary user response to determine at least one possible recognition value for each slot contained in the primary user response, filling each slot contained in the primary user response with a matched value selected from the corresponding possible recognition values, and repeating the outputting, receiving, processing and filling for any unfilled slots in the segment until all slots in the segment of slots are filled.

9 Claims, 20 Drawing Sheets

PRIOR ART
(Directed Dialog)

PRIOR ART
(Directed Dialog)

MULTI-SLOT DIALOGS

VOICE APPLICATION ARCHITECTURE

MULTI-SLOT DIALOG STRUCTURE

DIALOG SEGMENT

DIALOG FLOW

ACTIVE CONFIRM FUNCTIONALITY

PASSIVE CONFIRM FUNCTIONALITY

GOBACK FUNCTIONALITY

CHANGE FUNCTIONALITY

REVIEW FUNCTIONALITY

| Slot Group | Main Prompt | Help Prompt .... |
|---|---|---|
| From To Date Time am-pm | *What is your flight itinerary?* | *For example, you can say "Boston to San Francisco tomorrow at 6:30pm"* |
| From To | *From which city to which city are you flying?* | *Please say from which city to which city you'll be flying. For example, you can say "From Boston to San Francisco"* |
| To | *What is your final destination?* | *Please say your final destination city, for example "Los Angeles, California"* |
| Date Time am-pm | *When will you be flying?* | *I'm listening for a date of departure and time, for example "August 16th at around 3 pm"* |
| Date | *On what date are you flying?* | *You can say something like "August 15th", or "tomorrow" or "next Monday"* |
| Time am-pm | *At what time?* | *An approximate time will do. For example, "around 3pm"* |
| am-pm | *A.M. or P.M.?* | *I'm not sure if the time I heard is in the morning or evening. Please say a.m. or p.m.* |

PRE-RECOGNITION
SLOT GROUP
FIG. 14

| Slot Group | Active Confirm Prompt | Disambiguation Header Prompt |
|---|---|---|
| 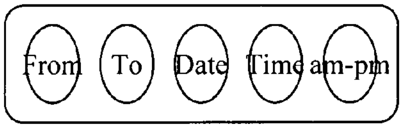 | *You're flying from <From> to <To> on <Date> at <Time> <am-pm>* | *I've found a number of possible itineraries.* |
| 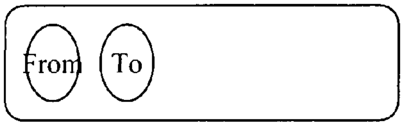 | *You're flying from <From> to <To>* | *I've found a number of possible departure and destination city combinations.* |
| 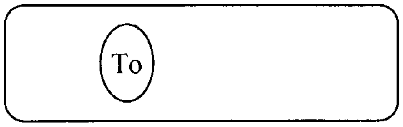 | *You're flying to <To>* | *I've found a number of possible destination cities.* |
| 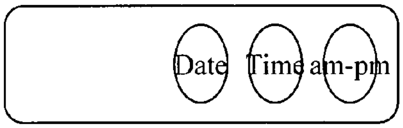 | *You're flying on <Date> at <Time> <am-pm>* | *I've found a number of possible flight times.* |
| 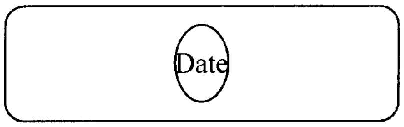 | *You're flying on <Date>* | *I've found a number of possible flight dates.* |

POST-RECOGNITION SLOT GROUP

FIG. 15

MULTI-SLOT DIALOG FLOW

PROCESS USER INPUT:
NORMAL MODE

PROCESS USER INPUT:
PASSIVE CONFIRM MODE

PRIMARY USER TURN GRAMMAR

CONFIRM TURN GRAMMAR

MULTI-SLOT DIALOG SYSTEMS AND METHODS

CROSS REFERENCE TO RELATED APPLICATIONS

The present application is a division of application Ser. No. 10/885,934, filed on Jul. 6, 2004, now U.S. Pat. No. 7,228,278.

BACKGROUND OF THE INVENTION

1. Field of the Invention

The present invention relates generally to speech recognition systems. More specifically, systems and methods for constructing a series of interactions with a user to collect multiple pieces of related information for the purpose of accomplishing a specific goal or topic (a multi-slot dialog) using a component-based approach are disclosed.

2. Description of Related Art

Speech recognition systems are a promising method for automating service functions without requiring extensive changes in user behavior. Many companies have sought to expand or improve their customer service functions by using speech recognition technology to automate tasks that have traditionally been handled by human agents. To achieve this, speech recognition systems should allow a user to ask for and provide information using natural, conversational spoken input. Recent advances in certain areas of speech recognition technology have helped alleviate some of the traditional obstacles to usable speech recognition systems. For example, technology advances have enabled unrehearsed spoken input to be decoded under a wider range of realistic operating conditions, such as background noise and imperfect telephone line quality. Additionally, recent advances have allowed voice applications to recognize voice inputs from a broader population of users with different accents and speaking styles.

Well-engineered voice systems achieve high customer acceptance. Unfortunately, building effective voice systems using past approaches has been difficult.

The earliest approaches required programming in the application program interfaces (APIs) of the speech recognition engine. These approaches burdened developers with low-level, recognition engine specific details such as exception handling and resource management. Moreover, since these APIs were specific to a particular recognition engine, the resulting applications could not be easily ported to other platforms.

The advent of intermediate voice languages such as VoiceXML as open standards somewhat simplified the development process. These intermediate voice languages accompanied a distribution of responsibilities in a voice system between a browser—which interprets the voice language and handles the telephony, voice recognition, and text-to-speech infrastructure—and a client application—which provides the user interaction code (expressed in the voice language). As a result, application developers no longer needed to worry about low-level APIs, but instead were responsible for generating documents that would be executed by the voice browser.

Even with these advances, however, developing voice applications remained complex for a number of reasons. For example, voice applications present a new user interaction model that is sufficiently distinct from the (well understood) graphical user interface to require specialized design and implementation expertise. Speech interface concepts, such as dialog management, grammar optimization, and multi-slot interfaces, are manually implemented in every custom-built voice system. Given the relative newness of the speech paradigm, this further burdens the developers. In addition, the demands on applications to handle presentation, business logic, and data access functions resulted in piecemeal architectures combining static and dynamically generated documents, backend servlets, grammars, and other disjoint components.

A number of products are available to simplify the development of enterprise voice applications. A central element of many of these products is a library of predefined and customizable voice components whose use reduces the amount of code that needs to be developed by a programmer. These components usually encapsulate the voice language code, grammars, internal call flows, prompts and error recovery routines required to obtain one piece of information from the caller, such as a date, a time, a dollar amount, a sequence of digits, or an item from a set or list of allowable items (such as a set of airports).

A major limitation of these component frameworks is that the components are not combinable to allow the user to provide multiple pieces of information in each utterance. For example, a flight reservation application could use four components: a departure airport, a destination airport, a departure date and a departure time. The existing frameworks would allow a user to provide the four pieces of information in four separate utterances. However, if the application were to allow the user to say the departure airport, destination airport and departure date in one utterance (e.g. "I'm flying from Boston to San Francisco on Monday"), the departure airport, destination airport, and departure date components could not be simply combined. Instead, a new component would need to be developed with new grammars, call flows, prompts, etc. to recognize the two airports and the date. To carry the example further, if the application were to allow the caller to retain some pieces of information while changing others pieces of information (e.g. "No, I'm actually flying to Oakland on Tuesday"), an even more complex component would have to be developed.

Because of these limitations, voice applications that rely on existing component frameworks implement highly directed dialogs in which the call flow is largely predetermined and each step accepts only a single item of information, such as in an interchange illustrated in FIG. 1*a*. Such voice systems are rigid and often penalize a caller who provides too much information, such as in an interchange illustrated in FIG. 1*b*. As a result, these systems are neither intuitive nor efficient since they cannot capture information rapidly or adapt to the user's preferences for providing information.

What is needed is a voice application that utilizes a more intuitive, rapid and natural approach for obtaining information from a user such as a caller.

SUMMARY OF THE INVENTION

Systems and methods for constructing a series of interactions with a user to collect multiple pieces of related information for the purpose of accomplishing a specific goal or topic (a multi-slot dialog) using a component-based approach are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The method generally includes outputting a primary header prompt to elicit values for slots in a segment from the user, receiving a primary user response containing a value for each slot in at least a subset of the slots in the segment, processing the primary user response to determine at least one possible recognition value for each slot contained in the primary user response, filling each slot contained in the primary user response with a matched value selected from the corresponding possible recognition values, and repeating the outputting, receiving, processing and filling for any unfilled slots in the segment until all slots in the segment of slots are filled.

The method may include performing turns to confirm and/or clarify the matched slot values such as by silently accepting a best match, passively confirming the best match, actively confirming the best match, disambiguating among the best matches, and notifying the user of non-recognition. The method for confirmation and/or clarification may be selected based on, for example, the number of possible recognition values for the slots in the primary user response and a corresponding confidence level for each of the possible recognition values. With an active confirmation, a user confirmation response is recognized as a confirmation, a cancellation, or a cancellation and correction. With a cancellation and correction, the correction is processed by determining at least one possible recognition value for each slot contained in the correction. With a passive confirmation, a passive confirmation prompt is output with a next primary header prompt. The method may also include enabling any unfilled slots in the segment of slots, in which the primary header prompt elicits values for enabled slots in the segment. The method may be text- or speech-based.

In another embodiment, a system for constructing and processing a multi-slot dialog with a user may generally include slot objects representing slots in a segment, each slot capable of being assigned a value based on the multi-slot dialog, at least one slot segment object each containing a corresponding set of slot objects, at least one set of slot group objects for each slot segment object, each slot group object defining parameters associated with a particular combination of slots in the slot segment object, and dialog objects that define a flow of the multi-slot dialog. The system may be implemented in an object-oriented programming language.

According to another embodiment, a method for constructing a multi-slot dialog with a user to obtain multiple items of information over a number of turns may generally include providing at least one slot segment object, each slot segment object containing a corresponding set of slot objects, each representing a slot in a segment, each slot representing an item of information to be provided by the user, providing at least one set of slot group objects for each slot segment object, each slot group object defining parameters associated with a particular combination of slots in the slot segment object, and executing a multi-slot dialog flow defined by dialog objects.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

FIGS. 14 and 15 illustrate some of the possible slot group objects for the pre-recognition and post-recognition slot group classes for a flight itinerary segment, respectively.

DESCRIPTION OF SPECIFIC EMBODIMENTS

Systems and methods for constructing a series of interactions with a user to collect multiple pieces of related information for the purpose of accomplishing a specific goal or topic (a multi-slot dialog) using a component-based approach are disclosed. The multi-slot dialog systems and methods obtain information from a user by conducting a speech-recognition based series of interactions. The systems and methods include determining the prompts output to the user as well as the grammars and semantic rules utilized to recognize user inputs such as utterances at each point in the conversation or interchange. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1A:
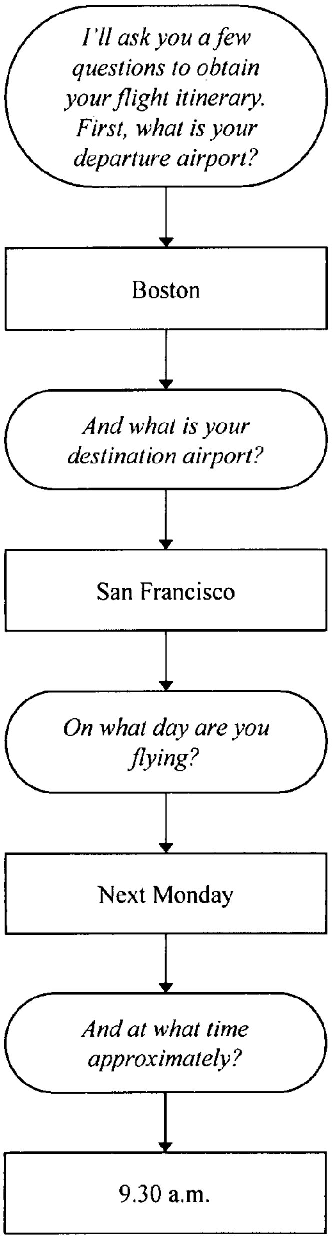
FIG. 1*a* and FIG. 1*b* illustrate examples of highly directed dialogs using conventional voice applications.
Figure 1B:
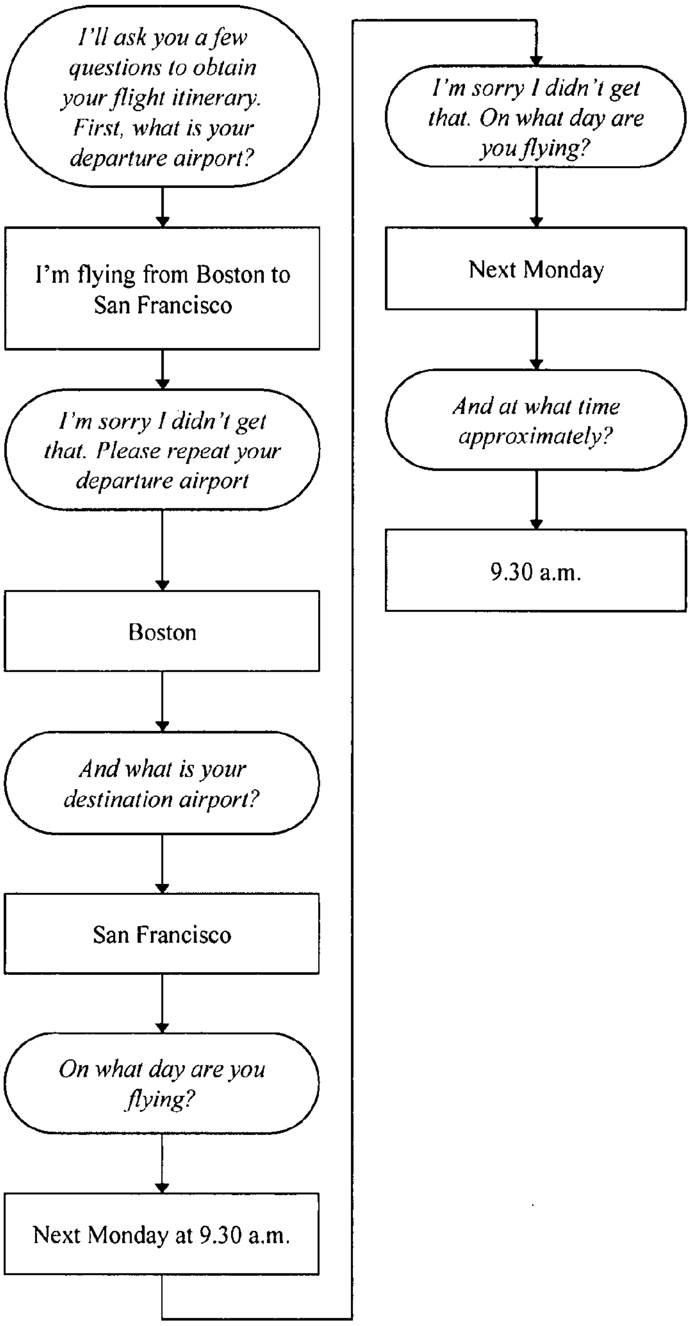
Figures 2A, 2B, 2C:
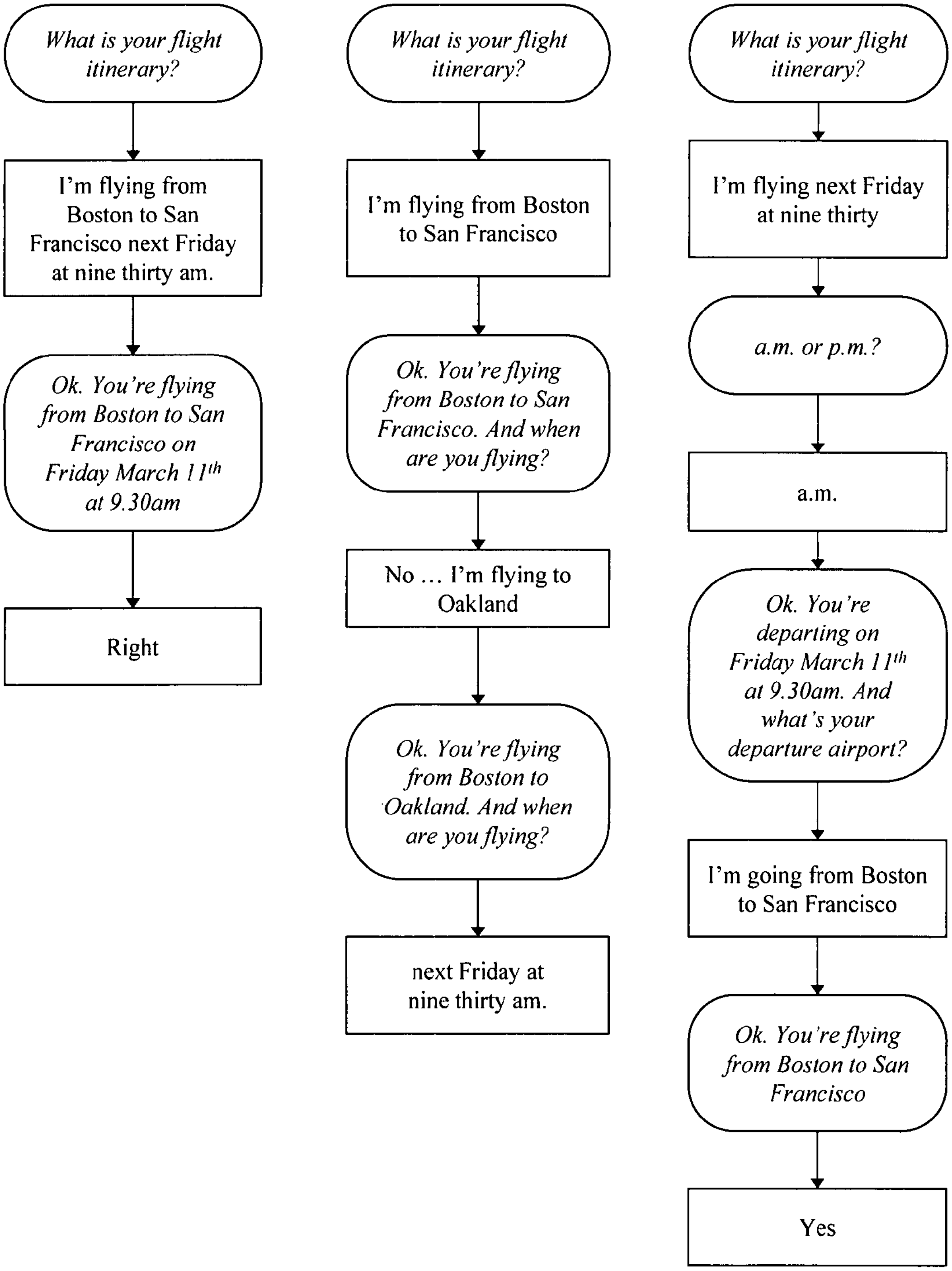
FIGS. 2*a*-2*c* illustrates various examples of multi-slot dialogs.

FIGS. 2*a*-2*c* illustrate various examples of multi-slot dialogs. A multi-slot dialog has the objective of collecting multiple pieces of related information ("slots") for the purpose of accomplishing a specific goal or topic, such as locating an airline reservation. In order to achieve a successful user interaction with the convenience and ease expected by humans, a multi-slot dialog application preferably handles certain behavior and interactions typical of human interactions in a spoken medium, including: (i) a caller may provide the slots in an arbitrary order, (ii) a caller may provide multiple slots in a single input such as a spoken utterance, (iii) a caller may provide only a subset of slots requested by the application in a single utterance, (iv) a caller may clarify or correct the application's interpretation of slots the caller has provided, (v) a caller may modify earlier slots in subsequent utterances.

To satisfy these human interaction requirements, a dialog application may perform a lengthy and sophisticated call path of considerable complexity. However, conventional voice applications are ill-suited for implementing multi-slot dialogs. In particular, the dynamic order and combinations in which information may be provided cannot be easily handled by existing component frameworks and development methodologies of conventional voice applications that specify rigid, predetermined call flows.

Rather than the manual approach, the multi-slot dialog systems and methods as described herein may be utilized for constructing multi-slot dialog applications using a component-based approach. Such component-based approach automates the multi-slotting process with components for the behavioral elements of a multi-slotting exchange between human and machine, including sequencing, grouping, prompting, confirmation, and/or modification strategies.

Figure 3:
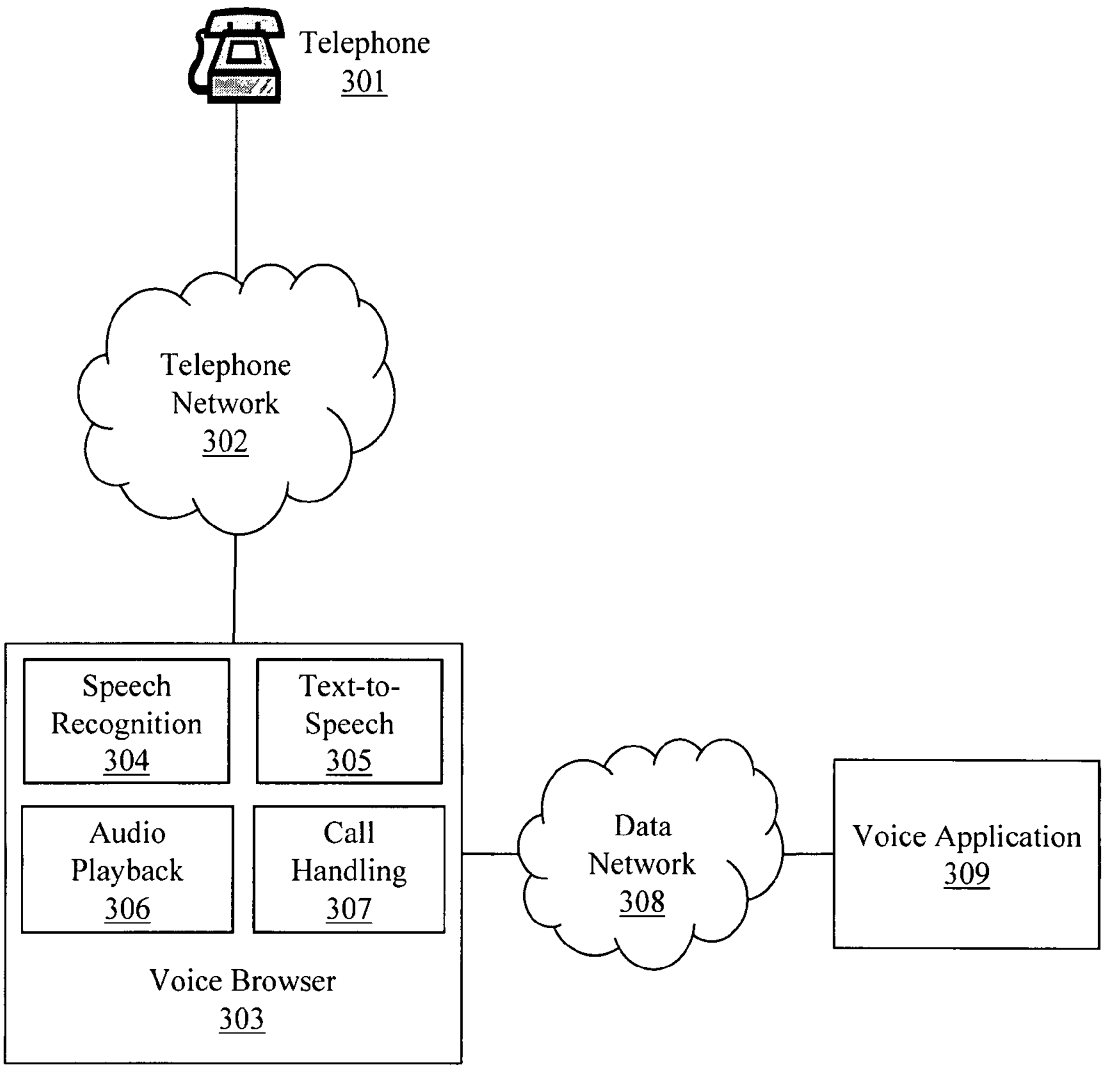
FIG. 3 is a block diagram of an illustrative multi-slot voice application system.

FIG. 3 is a block diagram of an illustrative voice application system 300 that generally includes a telephone 301 in communication with a voice browser 303 via a telephone network 302 which is in turn in communication with a voice application 309 via a data network 308. The voice browser 303 includes the hardware and software for conducting bidirectional audio communications with a caller via the telephone network 302 and the telephone 301. The voice browser 303 may execute a program expressed in a voice language transmitted in the form of documents over the data network 308 (such as the Internet or an intranet) from the voice application 309. The voice browser 303 and voice application 309 may reside on any of various suitable computer systems.

The voice language may be a markup language such as VoiceXML or Speech Application Language Tags (SALT). The voice browser 303 may include various components such as a speech recognition engine 304, a text-to-speech synthesizer 305, an audio playback player 306 for audibly rendering files recorded using generally available audio formats, and a component for handling calls over the telephone network 307. Commercially available and/or proprietary components for building voice applications may be employed in implementing any or all of the various components of the voice browser 303.

The voice browser 303 may be responsible for detecting an incoming call, answering the incoming call, requesting an initial voice document from the voice application 309, and interpreting the voice document and executing instructions contained in the voice document according to the rules of the applicable voice language. The instructions may include the outputting of audible prompts to the user and the processing of voice responses from the user using specified grammars. In outputting the prompts to the user, the voice browser 303 may utilize the audio playback player 306 to audibly render prerecorded messages or may utilize the text-to-speech synthesizer 305 to audibly render text messages. The voice browser 303 can then generate actions in response to user events (such as spoken input or call disconnection) or system events (such as subsystem exceptions), and/or actions that may be defined in the current document or in another document to be fetched from the voice application 309.

Figure 4:
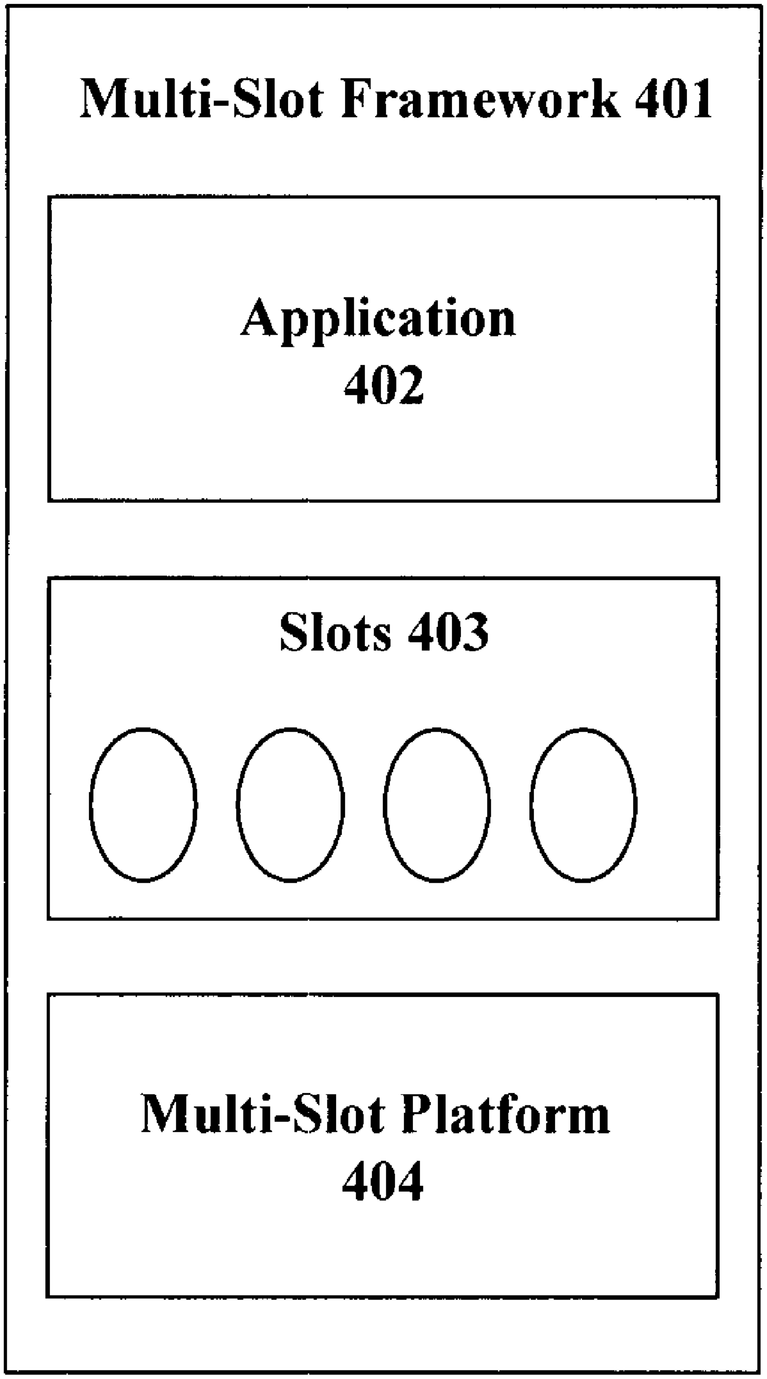
FIG. 4 illustrates one embodiment of a framework for managing a multi-slot speech recognition-based conversation.

The overall architecture of the voice application system 300 having been described, a multi-slot framework implemented by the voice application system 300, such as by a combination of the voice browser 303 and voice application 309, will now be presented. A system implementing the multi-slot mode of conversation generally prompts the user with more open-ended questions while a system implementing a conventional directed dialog mode of conversation prompts the user with more specific prompts and accepts a more limited set of responses. FIG. 4 illustrates one embodiment of a multi-slot framework 401 for managing a multi-slot speech recognition-based conversation. In particular, the multi-slot framework 401 implements a multi-slot mode for obtaining information from a user. The framework 401 may include a multi-slot application 402 that manages the business logic and data access responsibilities for a set of slots 403. A slot is referred to herein as a data item whose value can be obtained from a user input such as a text input or a spoken utterance. For example, a flight reservation application may manage a departure airport slot whose valid values are found in a flight schedule database, and whose value, once uttered or otherwise entered by the user, should be stored in a reservation record. A multi-slot platform 404 constructs one or more voice interactions to obtain the desired slots from the user.

Figure 5:
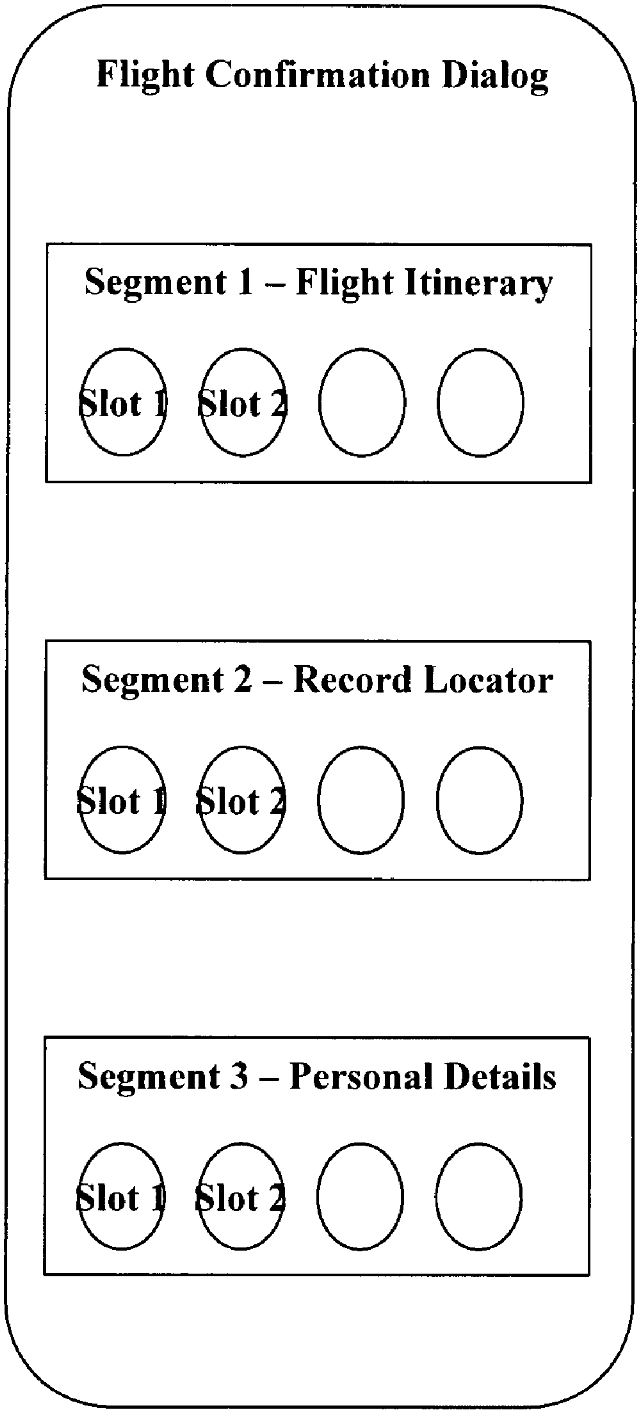
FIG. 5 illustrates examples of segments for a multi-slot flight reconfirmation dialog.
Figure 6:
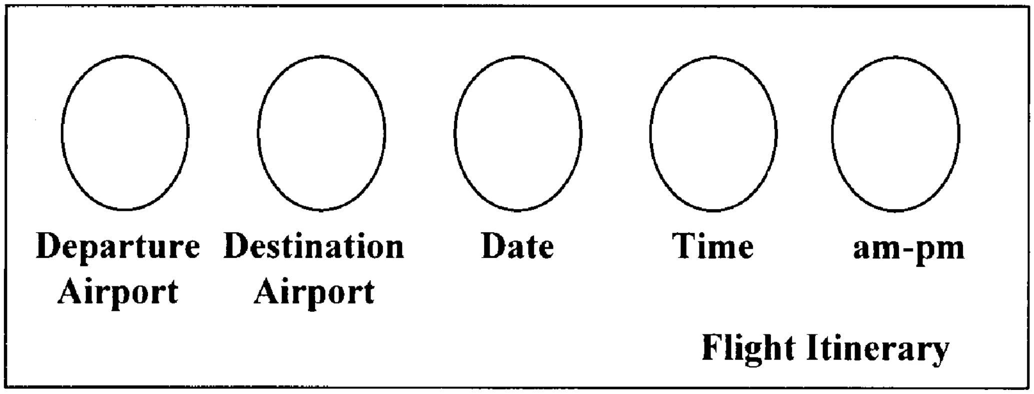
FIG. 6 illustrates the contents of one of the exemplary segments, namely, the flight itinerary, in the multi-slot flight reconfirmation dialog of FIG. 5.

FIG. 5 illustrates examples of segments for a multi-slot flight reconfirmation dialog and FIG. 6 illustrates the contents of one of the exemplary segments, namely, the flight itinerary, in the multi-slot flight reconfirmation dialog. In particular, a multi-slot dialog can be decomposed into sub-units at various levels. At the smallest level, a turn is an uninterrupted stream of input (e.g., speech) from one participant, i.e., the system or the user. Thus a system turn is one in which the system prompts the user with a message and a user turn is one in which the user makes an utterance that the system attempts to interpret. An exchange is a series of turns that captures the values for one or more slots from the user. Thus an exchange may include one or more confirmation, correction, or disambiguation turns until a final, single set of slot values is accepted by the system. A segment is a series of exchanges that captures a set of related slots. The segment is the largest unit of a dialog that allows all its associated slots to be provided in one user turn. In the example shown in FIG. 6, the five slots, namely, a departure airport, a destination airport, a date, a time, and an AM/PM indicator, form the flight itinerary segment such that up to all five slots of the flight itinerary segment may be entered in one user turn such as by the user uttering "from San Francisco to Boston tomorrow at 9 AM."

Multi-slot dialogs can vary in complexity from single segment dialogs to complex, multi-segment dialogs in which each segment includes one or more slots. An example of a single-segment dialog is a phone attendant application that requests an employee name from the caller. In contrast, an example of a multi-segment dialog is a flight reconfirmation dialog such as that shown in FIG. 5. For example, the flight reconfirmation dialog may request a flight itinerary from the caller (which may include slots for the departure and destination airports as well as the date, time and AM/PM indicator of the departure as shown in FIG. 6), and may verify the caller's identity by requesting a record locator and by requesting personal details, such as a surname.

Figure 7:
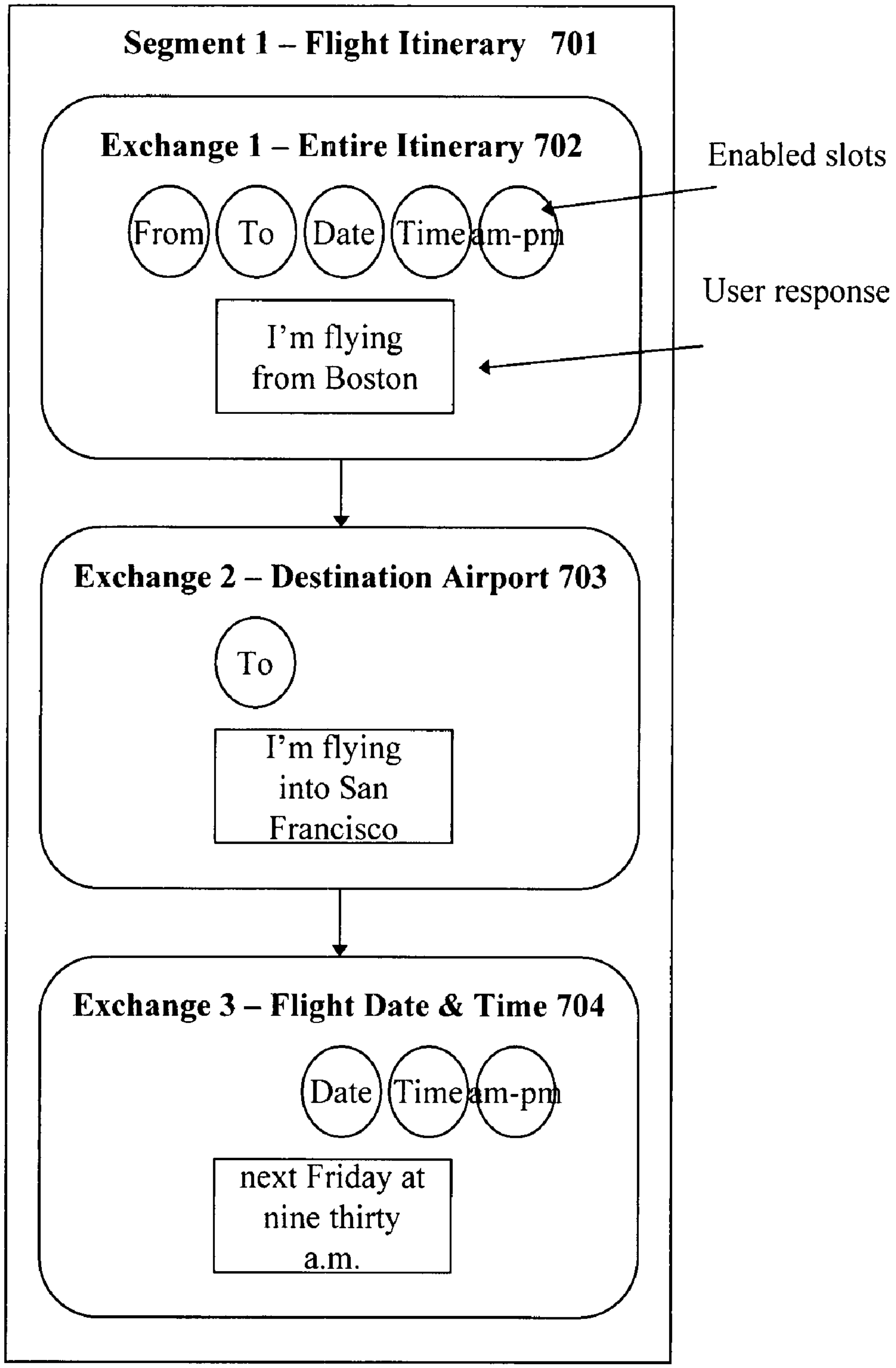
FIG. 7 illustrates examples of exchanges involved in a flight itinerary dialog.

FIG. 7 illustrates examples of exchanges involved in a flight itinerary dialog. The flight itinerary segment 701 contains 5 slots that represent a flight itinerary. In the first exchange 702, the system may prompt the user with "What is your flight itinerary?" to allow the user to enter information or values for up to all 5 slots. The user may respond with "I'm flying from Boston" and after any applicable confirmation/clarification turns, the application accepts Boston as the value for the departure airport slot. According to predefined logic, the application determines, for example, that only the destination airport should be prompted for in the next exchange 703, and outputs a prompt "And what is your destination?" After the user response is processed, the value San Francisco is stored in the destination airport slot. The application may then prompt for the remaining three unfilled slots in the next exchange 704 such as by outputting a prompt "And when are you flying?" The user's response of "next Friday at nine thirty AM" fills all three remaining slots and the dialog is complete.

Figure 8:
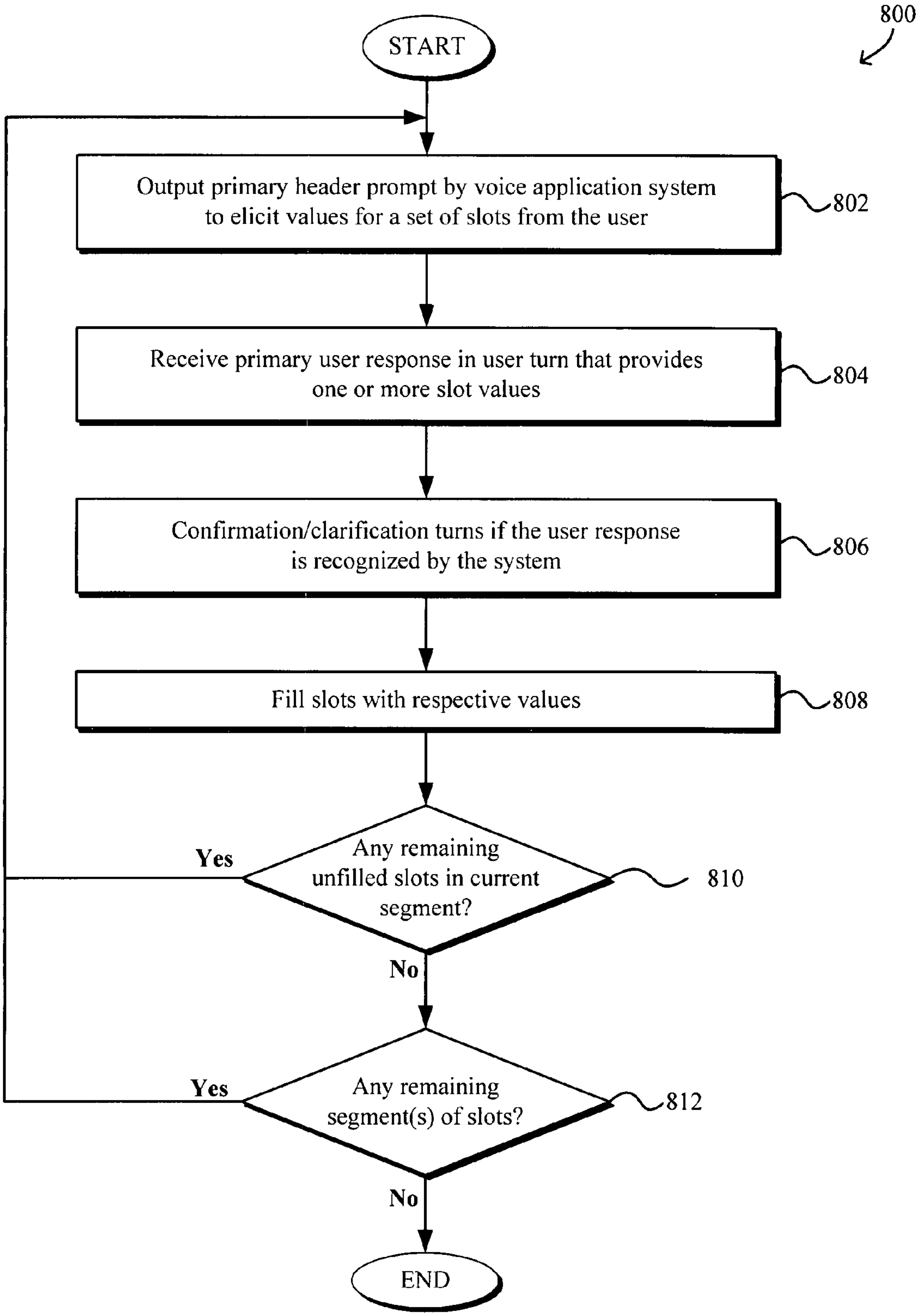
FIG. 8 is a flowchart illustrating various steps of an exemplary multi-slot dialog.

FIG. 8 is a flowchart illustrating an exemplary multi-slot conversation 800. At the start of an exchange at block 802, the voice application system outputs a primary header prompt to elicit values for a set of slots from the user. The system prompt is typically worded in such a way that the user may potentially provide values for a number of desired slots in one turn. At block 804, the user responds with a primary user turn in response to the output prompt. The user turn may provide one or more slot values. If the user turn is recognized by the system, a number of confirmation/clarification turns at block 806 may follow in which the system may optionally silently accept the best match, passively confirm the best match, demand active confirmation of the best match, disambiguate among the best matches, or notify the user of a non-recognition, for example, as will be described in more detail below. When the slot values from the turn are confirmed either explicitly or implicitly, the slots are filled with their respective values at block 808.

Blocks 802-808 represent one exchange. When the current exchange is complete, the system determines if there are any remaining unfilled slots in the current segment at decision block 810. If all slots in the current segment are filled, then the system determines if there are any additional segment(s) of slots at decision block 812. If all slots in all segments are filled, then the multi-slot dialog 800 is complete. Alternatively, if there are remaining unfilled slots in the current segment and/or if there are additional segment(s) of slots, the dialog 800 returns to block 802 to initiated the next exchange. For example, the next exchange may either follow up on the previous exchange by prompting for any remaining slots that were not filled (e.g., "... and around what time?") or continue onto the next segment of slots by prompting for a new set of slots (e.g., "What type of car do you want to rent?").

As noted above, if the user turn is recognized, a number of confirmation and/or clarification turns may follow in which the system may optionally demand active confirmation of the best match, passively confirm the best match, disambiguate among the best matches, silently accept the best match, or notify the user of a non-recognition, for example. Details of the confirmation/clarification turns will now be described in more detail with reference to FIGS. 9 and 10.

Figure 9:
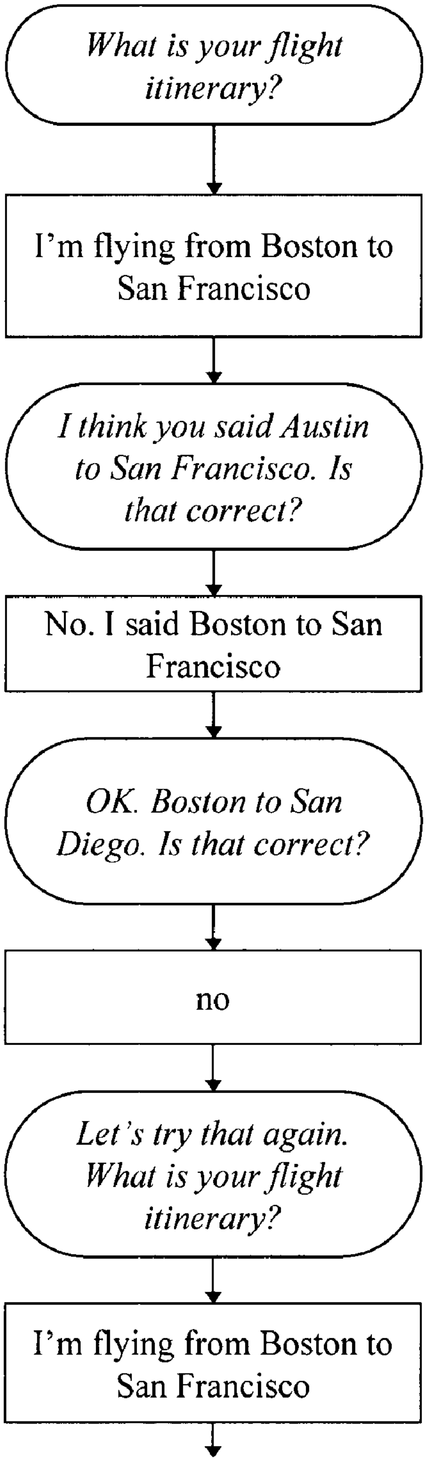
FIG. 9 is a flowchart of an exemplary exchange using active confirmation.

In particular, FIG. 9 is a flowchart of an exemplary exchange using active confirmation. In an active confirmation, a confirmation prompt is output to the user (e.g., "I think you said Austin to San Francisco. Is that correct?"). The confirmation prompt may escalate during an exchange if there are several confirmation cycles. The system may require that the user explicitly accept the value(s) for the associated slots prior to filling the slots. The user can cancel the previous recognized values by saying a cancel phrase such as "No" or "No, that's wrong." In addition, to facilitate a more efficient interaction, the system may optionally accept an utterance by the user that includes a cancel phrase followed by a correction such as "No, I said Boston to San Francisco." If the user cancels the previous recognized values, the system may clear all slot values recognized in the user turn and play a message such as "Let's try that again. What is your flight itinerary?" as shown in FIG. 9 and begin the exchange again. Alternatively, the system may treat the user response uttered in the user turn as a correction and repeat the confirmation/clarification turn, e.g., by prompting "OK. Boston to San Diego. Is that correct?" If the correction omits some of the slots that are being confirmed, the system may retain the previously uttered values of such slots.

Figure 10:
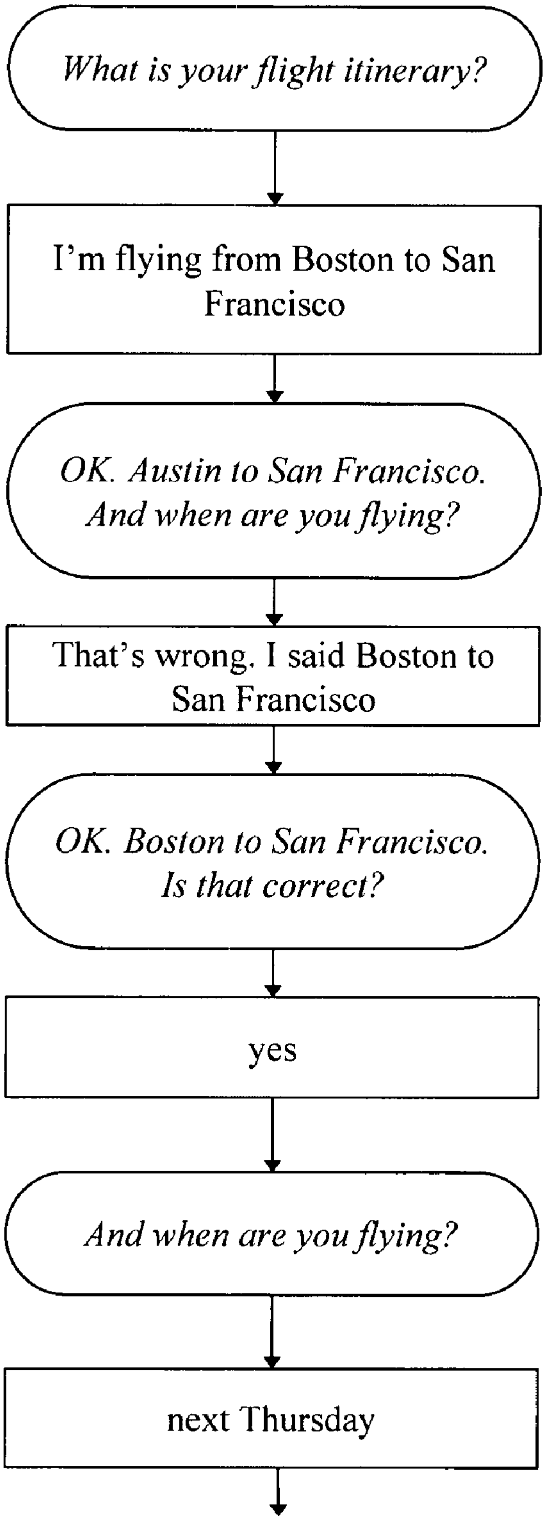
FIG. 10 is a flowchart of an exemplary exchange using passive confirmation.

FIG. 10 is a flowchart of an exemplary exchange using passive confirmation. In a passive confirmation, the multi-slot dialog system outputs a prompt that is a combination of a passive confirmation prompt and a header prompt for the next exchange. As an example, the combined output prompt may be, for example, "Ok. Austin to San Francisco. And when are you flying?" As the user does not need to explicitly utter a confirmation if the values are correct, the passive confirmation technique facilitates in speeding up the dialog and thus is suitable for confirming recognition results where the system has a high level of confidence. When passive confirmation is utilized, the slots are filled with their respective values and those filled values may be removed or rolled back when the user utters a cancel phrase such as "No" or "No, that's wrong," or a cancel phrase followed by a correction such as "That's wrong. I said Boston to San Francisco." If the user issues a cancel via a cancel phrase, the system may clear the slot values accepted in the previous exchange, issue a prompt such as "Sorry, let's try that again," and repeat the previous exchange. Alternatively, the system may treat the user response uttered in the user turn as a correction and repeat the confirmation/clarification turn, e.g., by prompting "OK. Boston to San Francisco. Is that correct?" If the user then utters an accept phrase such as "Yes" in response, the header prompt for the new exchange is repeated. As is evident, an active confirmation may be utilized after the user issues a cancel phrase in response to a passive confirmation. However, other confirmation types may be similarly utilized after the user issues a cancel phrase in response to a passive confirmation. If the next exchange contains a prompt for a "Yes/No" response, the functionality to rollback a previous passive confirm of the passive confirmation may be disabled.

In a disambiguation, the system outputs a prompt containing a list of the top matches and requests the user to select one of the top matches, e.g., by its corresponding number. Each match may include a single slot value or a set of slot values and may be presented by a prompt similar to a confirmation prompt that contains all the recognized slot values. When a match is selected, the corresponding value or values are treated as if they had been uttered in the primary user turn and the system repeats the confirmation/clarification process.

The system may also notify the user of a non-recognition. In particular, when a user turn is not recognized by the system, the system may issue an exception prompt such as "I didn't get that" and repeat the previous system turn or an amended version thereof.

The system may be configured with various features and functionalities to further facilitate the exchange as will be described below in more detail with reference to FIGS. 11-13.

For example, the system may be configured to maintain a skip list in a given exchange in which a skip list entry corresponding to the set of slot values presented in a confirmation is added each time a user cancels the confirmation during that exchange. The skip list helps to ensure that, within the same exchange, the system does not utilize and thus will not present again a set of values that matches an entry in skip list. Instead, the system may utilize the next best match when available.

Figure 11:
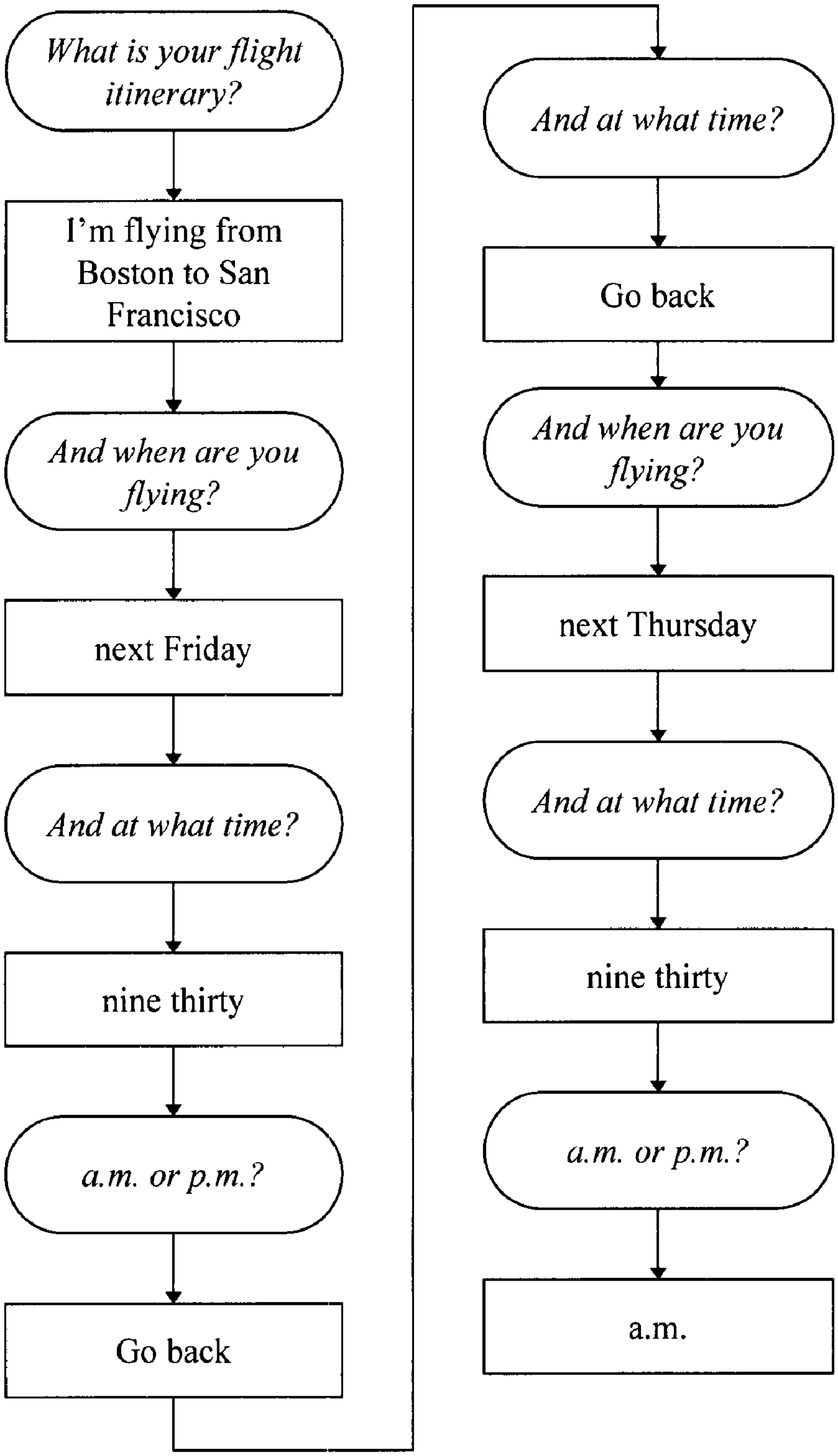
FIG. 11 is a flowchart illustrating an example of a conversation utilizing a go back functionality of a multi-slot dialog system.

FIG. 11 is a flowchart illustrating an example of a conversation that includes yet another optional functionality of the system, namely, a go back functionality. Specifically, the user may utter a go back command, e.g., "go back," at any time so as to return to the start of the previous turn, the start of the current exchange, or the start of the current segment, depending on the application. If the system goes back over a step that has filled some slots, these slots may be cleared.

The multi-slot dialog system may be configured to adaptively present a more directed prompt after a threshold number of exceptions, corrections, or gobacks has occurred during an exchange. For example, the system may present a new, more directed header prompt "What date will you be picking up the car? For example, say tomorrow, next Tuesday, or July 24." If the exceptions, corrections or gobacks continue to occur, the system may transfer the user to a live operator for further assistance.

Figure 12:
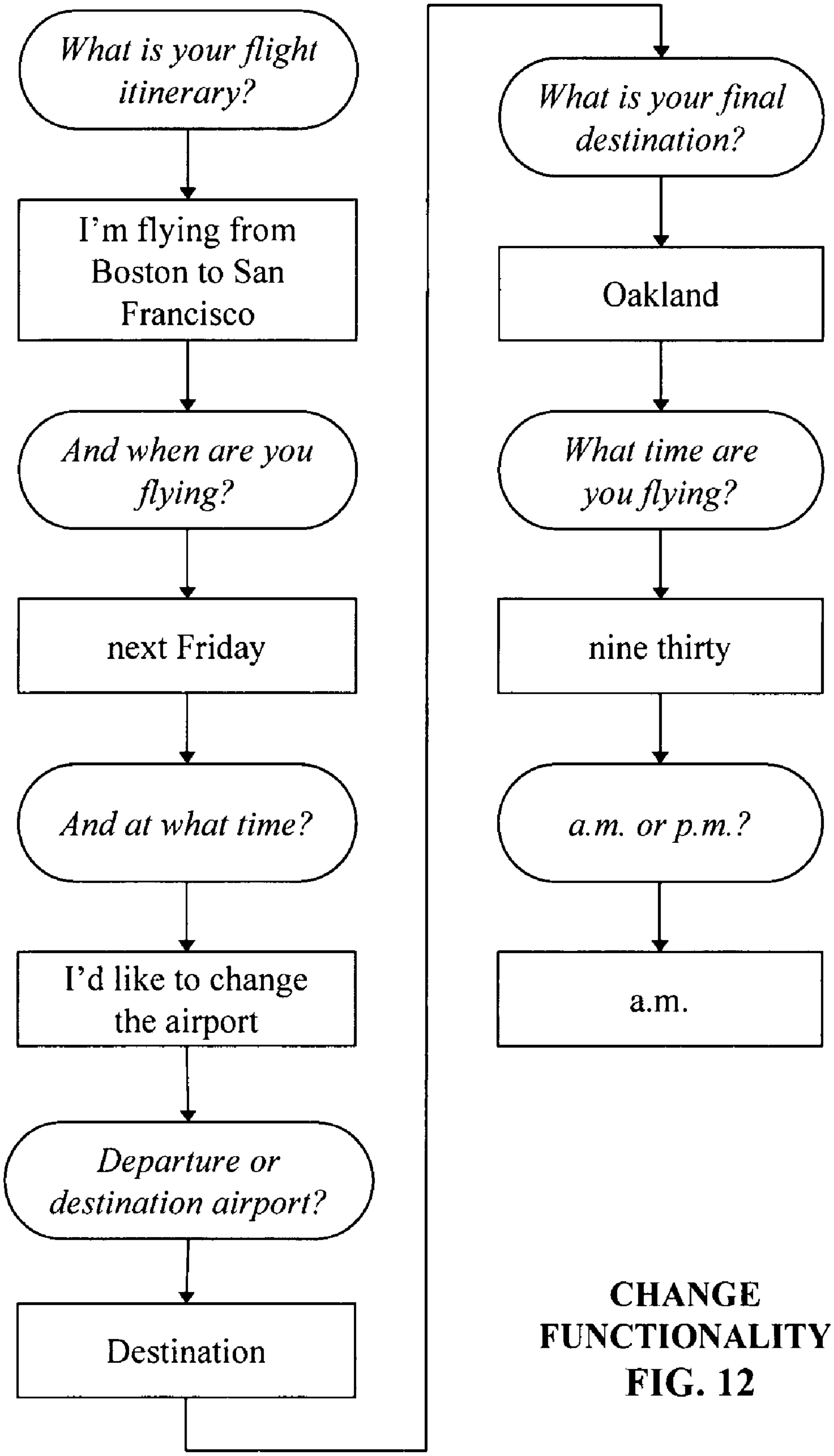
FIG. 12 is a flowchart illustrating an example of a conversation utilizing a change functionality of the multi-slot dialog system.

FIG. 12 is a flowchart illustrating an example of a conversation that includes yet another optional functionality of the system, namely, a change functionality. The change functionality allows the user to change a previously filled slot value by uttering, for example, "I'd like to change the airport." If the user's utterance requesting a change does not fill all the slots required for a change request, the system initiates a follow-up exchange such as "Departure or destination airport?" The change command may optionally be confirmed using any of the confirmation mechanisms described above. For example, the system may actively confirm the change command by prompting "I heard you say you wanted to change the arrival airport. Is that correct?"

The change command cancels the exchange the user is currently in and clears at least some of the previously filled slot values. A new exchange then begins that prompts the user for the cleared slots which can be filled in one or more exchanges. Once the cleared slots are filled, the system continues processing and will bypass some previous exchanges if the slots associated with those exchanges are still filled.

Figure 13:
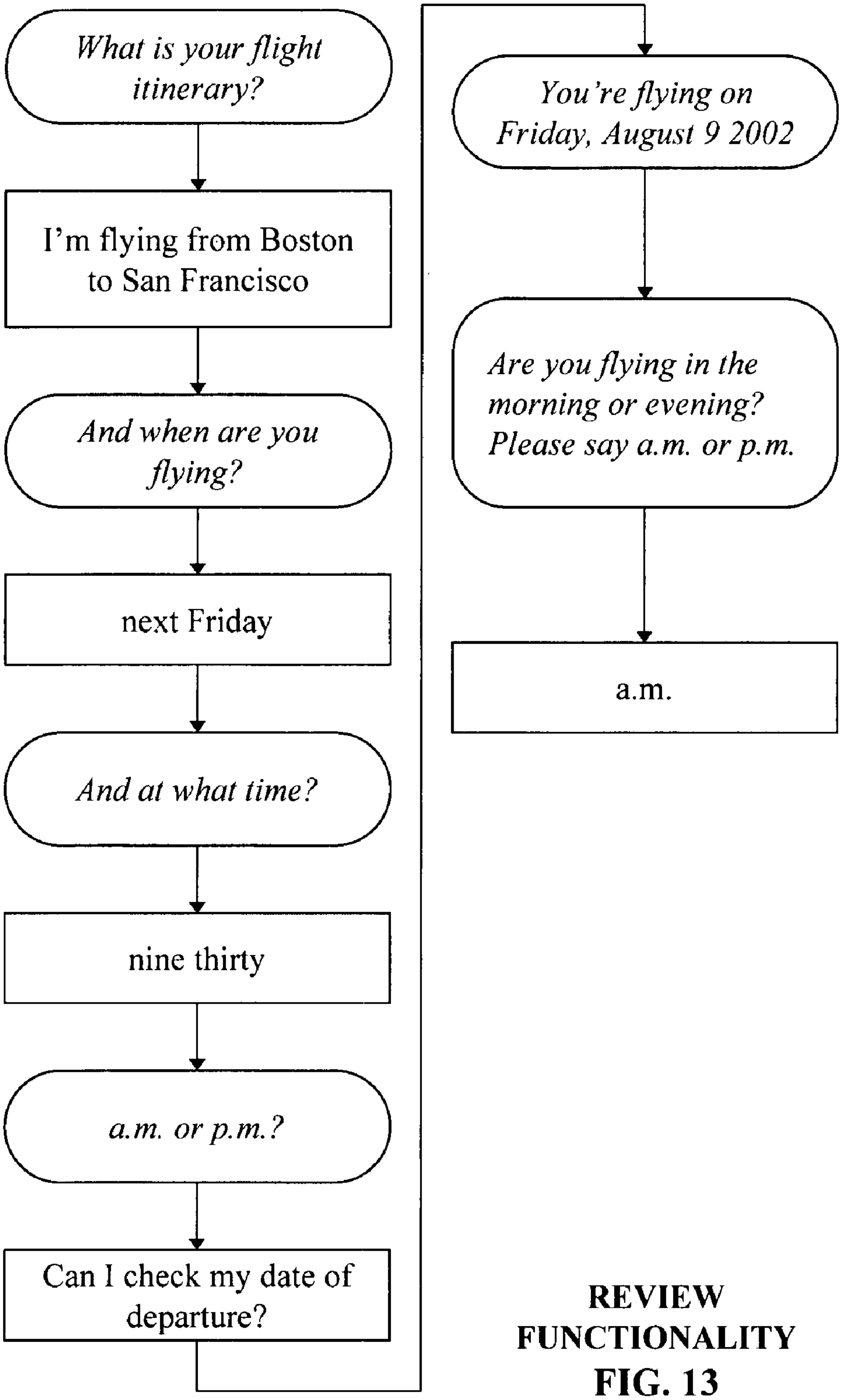
FIG. 13 is a flowchart illustrating an example of a conversation utilizing a review functionality of the multi-slot dialog system.

FIG. 13 is a flowchart illustrating an example of a conversation that includes yet another optional functionality of the system, namely, a review functionality. In particular, the user may request to review a previously filled slot value by uttering a request phrase such as "Can I check my date of departure?" In response to the review command, the system plays the filled slot value such as "You're flying on Friday, Aug. 9, 2002" and returns to the current exchange. If the user does not provide the values for all the slots required for a review request, the system initiates a follow-up exchange such as "Departure or return date?"

Implementation of Multi-Slot Dialog

An exemplary system or platform for implementing multi-slot dialogs will now be described. Merely by way of example, the platform for implementing multi-slot dialogs is described herein as being implemented utilizing Java. However, it is to be understood that the system may be implemented using any suitable programming language, preferably an object-oriented programming language such as Java or C++. The system generally includes slot objects, slot group objects, segment objects, and dialog objects. Each of these objects is described below.

A slot object represents a slot which, as noted above, is an item of information to be obtained from the user. A slot object contains the grammar that recognizes the possible values that can be provided by the user for the corresponding slot, the rules that map grammar recognition results to semantic values for the slot, and the variables indicating the enabled and filled state (among other state variables) for the slot. The slot objects can be based on a Java interface that provides basic default functionality and/or functionality common to all slot objects.

The grammar that recognizes the possible values that can be provided by the user for the corresponding slot is a formal specification of the utterances the system accepts for expressing the possible values for the slot. The grammar may include the vocabulary of words that may be used and valid structures for sequencing those words. For example, the grammar for a date slot should allow various date formats to be recognized, ranging from absolute specifications such as "January the twelfth two thousand and four" to relative forms such as "this coming Friday" and familiar terms such as "today" and "yesterday." The grammar may also include fillers that may precede and/or follow the slot value in a user's utterance but that do not specify or distinguish one slot value from another. For example, an airport slot may have the preceding filler phrase "I'm flying from." Some grammars may be highly application specific such as the grammar for the allowable airports in a flight reservation application. Other grammars may be reused across applications, such as the grammar for a date, a time, or a dollar amount. The common portion of these grammars may be predefined in a grammar object and customized for a particular slot.

In addition to the rules of the grammar, each slot object also contains rules that map the grammar recognition results to semantic values for the corresponding slot that are meaningful to the specific application. For example, a destination airport slot object may map the utterances "San Francisco," "San Francisco Airport," "San Francisco International Airport," and "SFO" to a single airport identifier such as "SFO." As another example, a date slot object may map the utterance "tomorrow" to a date value that is computed as the next date following the current date.

Each slot object also maintains a number of state variables or flags used during the execution of a multi-slot dialog to indicate the enabled and filled state (among other state variables) for the corresponding slot. Examples of flags include enabled, optional, filled, and pending flags. In particular, an enabled flag is set to true to indicate that a slot can be accepted in the upcoming user turn. An optional flag is set to true if an enabled slot does not need to be explicitly provided by the user. A filled flag is set to true when a slot value has been accepted after any applicable confirmation/clarification. A pending flag is set to true if a value for the slot has been recognized from the user but has not yet been accepted, e.g., pending confirmation.

The system maintains slot group objects for each slot segment, examples of which are shown in FIGS. 14 and 15 for a flight itinerary segment. Each slot group object defines parameters or properties associated with a particular group or combination of slots in the slot segment. Examples of slot group properties include prompts such as header or main prompts, help prompts, error prompts, confirmation prompts, and/or disambiguation prompts, as well as recognition properties, i.e., variables that affect recognition behavior such as timeouts, recognition thresholds, recognition parameters, caching policies and so on. Different slot group classes, e.g., pre-recognition and post-recognition slot group classes as shown in FIGS. 14 and 15, respectively, may be defined to maintain separate sets of properties.

Specifically, FIG. 14 illustrates some of the possible slot group objects for the pre-recognition slot group class for the flight itinerary segment. The pre-recognition slot group class may contain the prompts and recognition properties used before slot values are recognized, such as the header or main prompts, the help prompts, no match prompts, no input prompts, timeouts, confidence thresholds and so on. When the pre-recognition slot group class is used, the slot combination would typically be compared to the currently enabled set of slots.

FIG. 15 illustrates some of the possible slot group objects for the post-recognition slot group class for the flight itinerary segment. The post-recognition slot group class may contain the prompts and recognition properties used after slot values are recognized, such as the active confirmation prompts, disambiguation prompts, passive confirmation prompts, and so on. When the post-recognition slot group class is used, the slot combination would typically be compared to the currently pending set of slots, i.e., the slots recognized from the user but not yet confirmed.

When a parameter such as a prompt or a recognition property is required at a point in a multi-slot dialog, the system identifies a best match slot group object from a slot group class that contains the parameter and looks up the value of the desired parameter in the identified best match slot group object. For example, where a header prompt is required at a point in a multi-slot dialog in order for the system to elicit from the user the values for the slots in the currently enabled slot combination, e.g., date, time, and AM-PM, the system identifies a best match slot group object from the pre-recognition slot group class in FIG. 14. The system selects the slot group object whose slot combination is the closest to the currently enabled slot combination. The closest slot combination may be determined utilizing various suitable methods such as the most number of overlapping slots, the fewest number of non-overlapping slots in the slot group object, or the fewest number of non-overlapping slots in the enabled group. In the current example, the system identifies and utilizes the slot group object in the pre-recognition slot group class shown in FIG. 14 having an exact match slot combination as the currently enabled slot combination, i.e., date, time, and AM-PM. However, if an exact match slot group object is not found, another group object deemed as the closest may be identified and utilized, e.g., a group object with a two-slot combination such as time and AM-PM slots. The system may define a separate slot group object for each slot of the slot segment to ensure that a slot group can always be found for any enabled slot combination.

The system also includes segment objects. A segment object maintains a set of slots in a slot segment that determines a series of one or more successive multi-slot exchanges. The values for the slots in a given slot segment may potentially be obtained from the user in a single exchange. Alternatively, if the user does not provide the values for all the slots in that segment in one exchange, follow-up exchanges are initiated until all required, i.e., non-optional, slots are filled. When a segment is filled completely, the next segment, if any, is then invoked.

Figure 16:
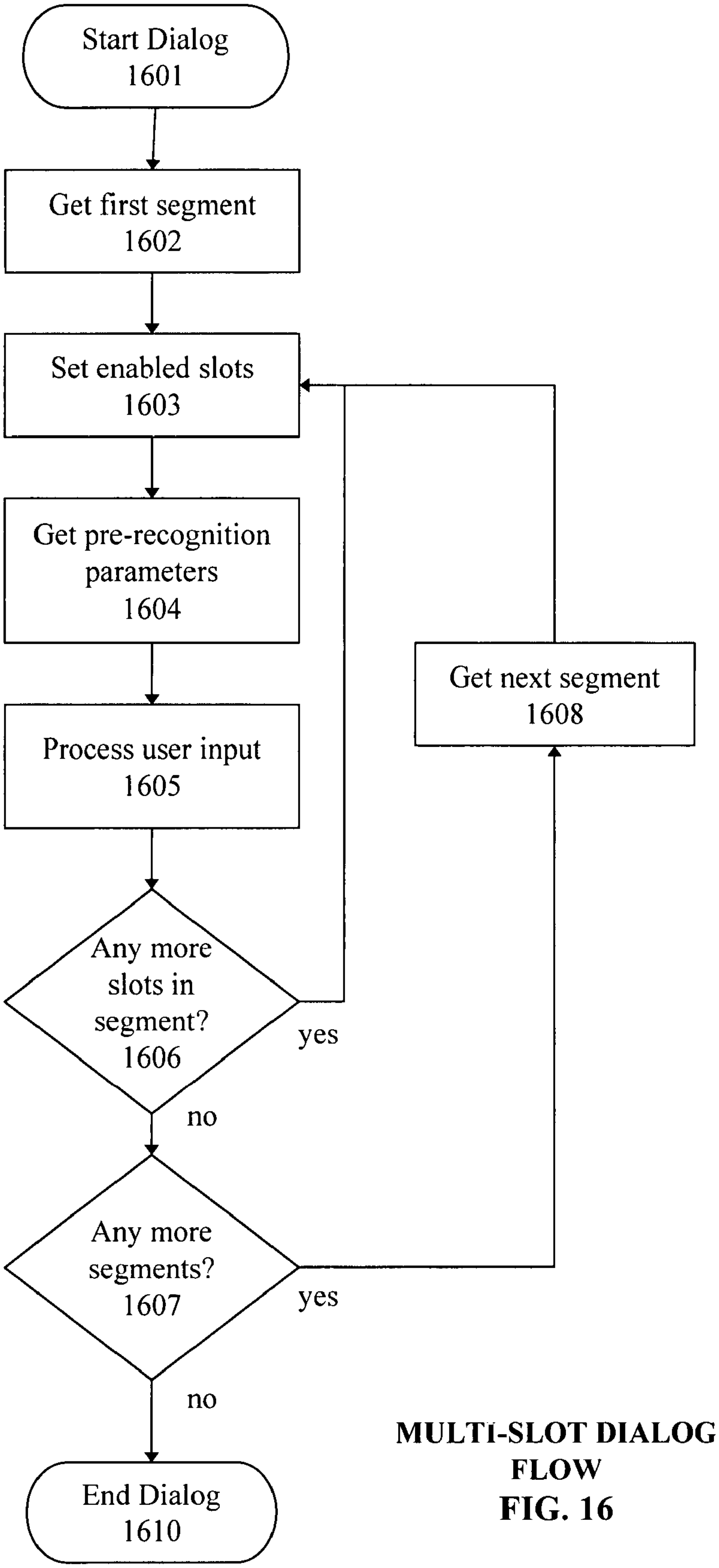
FIG. 16 is a block diagram illustrating an exemplary dialog flow structure.

The system further includes dialog objects that define the dialog flow. While each multi-slot dialog can perform a different function, the dialog flow for each dialog generally has a common structure. FIG. 16 is a block diagram illustrating an exemplary dialog flow structure. After the system initiates a dialog at block 1601, the system obtains the first segment in the dialog at block 1602. The system determines the slots in this segment that should be enabled at block 1603 such as by including the slots that are not yet filled. The closest pre-recognition slot group is selected to retrieve the header prompt and other pre-recognition parameters at block 1604 (such as the help prompt and any exception prompts). The header prompt is usually worded in such a way that the user may potentially provide a number of desired slots in one utterance. For example, if the slots include a date slot, a time slot, and a meridian (AM/PM) slot, the prompt could be "When will you be picking up the car?" The user's response is then received and processed by the system at block 1605 such as by obtaining the best hypotheses of the user's intended word sequence from the speech recognition engine and performing any desired confirmation, clarification or disambiguation based on the custom settings of the application until a single set of slot values is accepted by the system.

The system then determines whether the slot segment contains any more slots to be filled at decision block 1606 which usually includes slots whose values have not yet been filled. It is noted that the system, in determining whether the slot segment contains any more slots to be filled at decision block 1606, may apply application-specific logic specifying that some slot values may or should be automatically filled from other slot values, that some slots are optional, or that certain additional slots need to be filled as a result of the values of other accepted slots. If some slots do remain to be filled as determined in decision block 1606, the system returns to block 1603 to enable the next set of slots. Otherwise, the system continues to decision block 1607 to determine if there are any more slot segments. If there is at least one more slot segment remaining, the system obtains the next segment at block 1608 and returns to block 1603. Alternatively, if no other slot segments remain, the dialog ends at block 1610.

Figure 17:
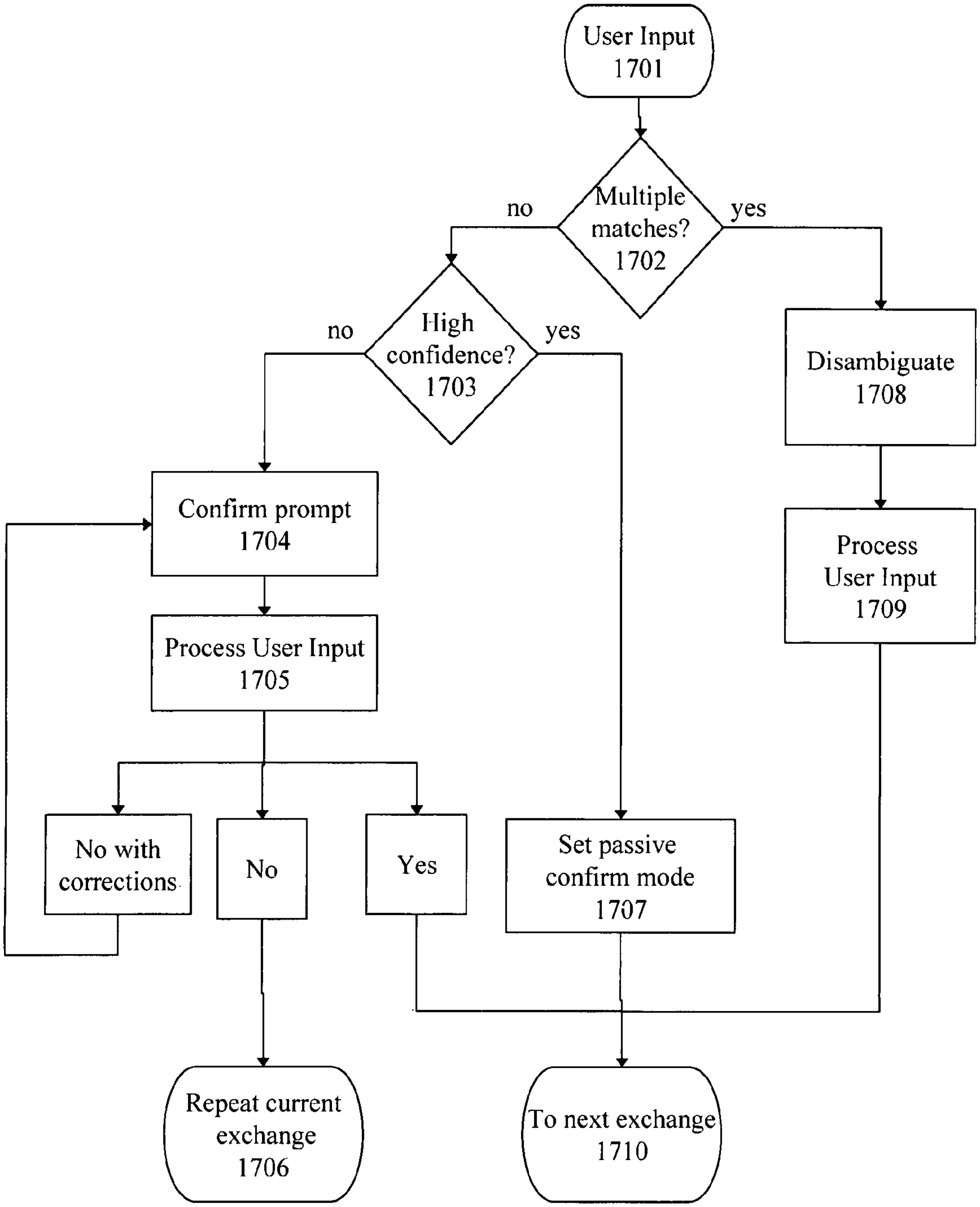
FIGS. 17 and 18 are flowcharts illustrating exemplary processing of the user's input in normal and passive confirm modes, respectively.
Figure 18:
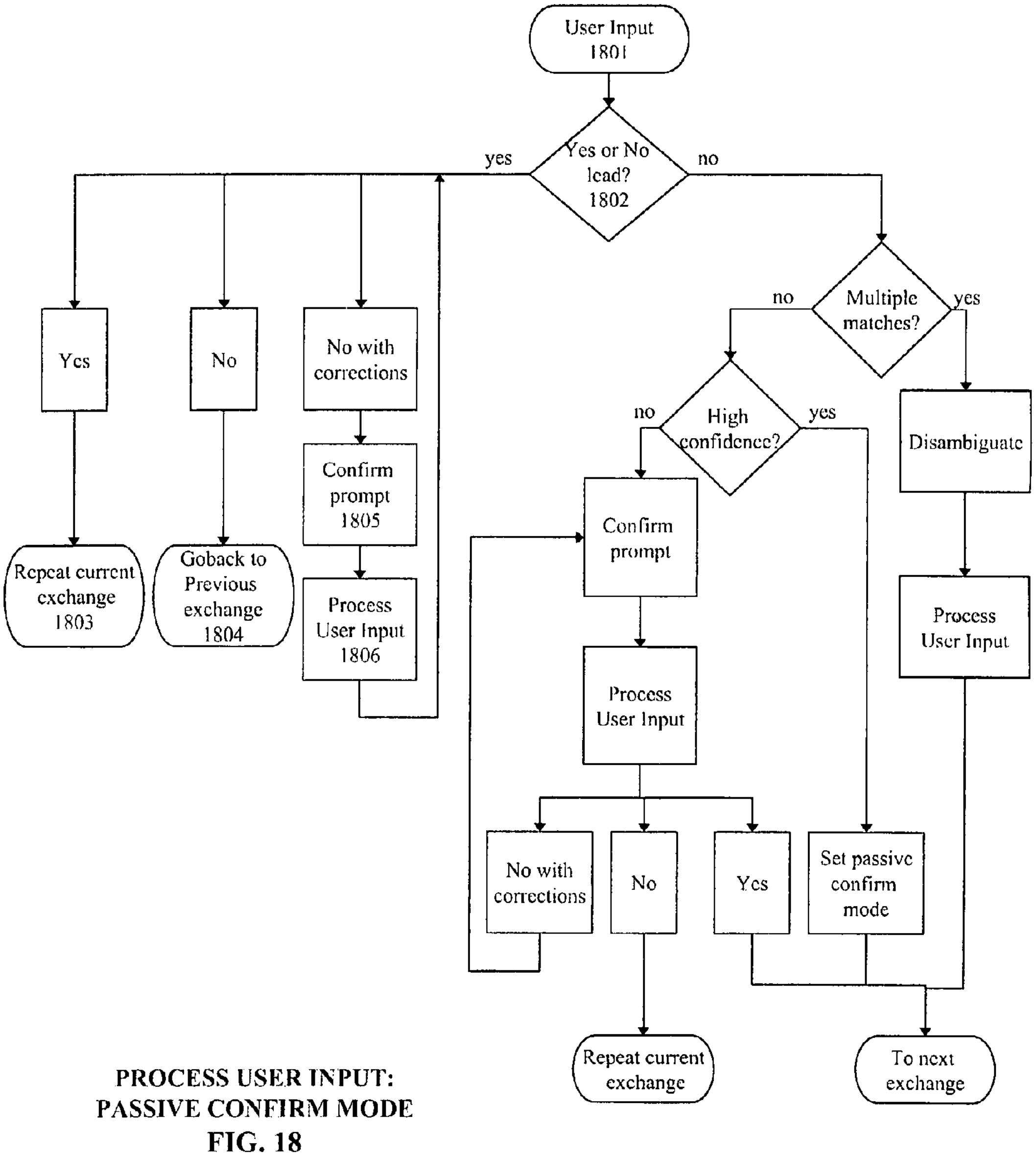

When processing the user's input, the system may be in a normal mode or passive confirm mode. Passive confirm mode is activated when the system determines that the user's response should be passively confirmed based on some predefined criteria. One such set of criteria could be that the confidence level returned by the speech engine is below the threshold for silent acceptance but above the threshold requiring active confirmation. If passive confirm mode is not activated, the system may be in normal mode by default. FIG. 17 is a flowchart illustrating an exemplary processing of the user's input in normal mode while FIG. 18 is a flowchart illustrating an exemplary processing the user's input in passive confirm mode. The determination as to normal versus passive mode may be based on, for example, a weighted or average confidence level for the set of slots to which the user's response corresponds. When dealing with a user response with values for multiple slots, the determination may be made with a single determination for all slots in the user response or a separate determination for each slot in the user response and the separate results averaged or weighted, for example.

In normal mode as illustrated in FIG. 17, the speech engine recognizes the user's input and returns one or more hypotheses at block 1701. If several possible matches are returned by the speech engine as determined at decision block 1702, the possible matches may be disambiguated at block 1708. For example, the user may be presented with a list of top matches and asked to select one. Each match may be presented by a disambiguation prompt similar to a confirmation prompt. When a match selected by the user is received and processed at block 1709, the system proceeds to the next exchange at block 1710.

Alternatively, if only one hypothesis, i.e., the best match, is returned by the speech engine as determined at decision block 1702, the system determines whether the confidence level for the one hypothesis is at or above a predefined high confidence threshold at decision block 1703. If the high confidence level is at or above the high confidence threshold, the system accepts the slot values and enters passive confirmation mode at block 1707. Alternatively, if the high confidence level is below the high confidence threshold, the system actively confirms the best match by outputting a confirmation prompt at block 1704. For example, the system may construct the confirmation prompt by identifying the slot group in the post-recognition slot group class that is closest to the group of slots in the best match and retrieving the corresponding active confirmation prompt. The user's response to the confirmation prompt is received and processed at block 1705. If the user cancels the confirmation, e.g., by uttering a cancel phrase such as "no" or "that's wrong," and provides a correction, the corrected values may return to block 1704 for confirmation. If the user cancels the confirmation with no correction, the current exchange is repeated at block 1706. In other words, any pending slot values are discarded or cleared and the system repeats the header prompt that was originally played. If the user accepts the confirmation, e.g., by uttering a phrase such as "yes" or "that's right," the system accepts the slots values and proceeds to the next exchange at block 1710.

In passive confirm mode as illustrated in FIG. 18, the confirmation prompt from one exchange is combined with the header prompt for the next exchange. For example, the combined prompt may be "Ok. Boston. And what date will you be flying?" The user's response is then recognized by the speech engine at block 1801. If the user's response does not begin with an accept or cancel phrase, i.e., a yes or no lead, as determined at decision block 1802, the user's response is processed as in the case of the normal mode described above. Alternatively, if the user response begins with an accept or cancel phrase as determined at decision block 1802, the previous slot values may be affected. If the user response is an affirmative user response, the header prompt for the new exchange may simply be repeated, for example "And what date will you be flying?" at block 1803. If the user response is a negative user response without a correction, the system may clear the slot values accepted in the previous exchange, play a message such as "Sorry, let's try that again," and repeat the previous exchange at block 1804. For a negative user response with a correction, the corrected values are explicitly confirmed at block 1805 until the previous exchange's slots are explicitly accepted or cancelled.

Figure 19:
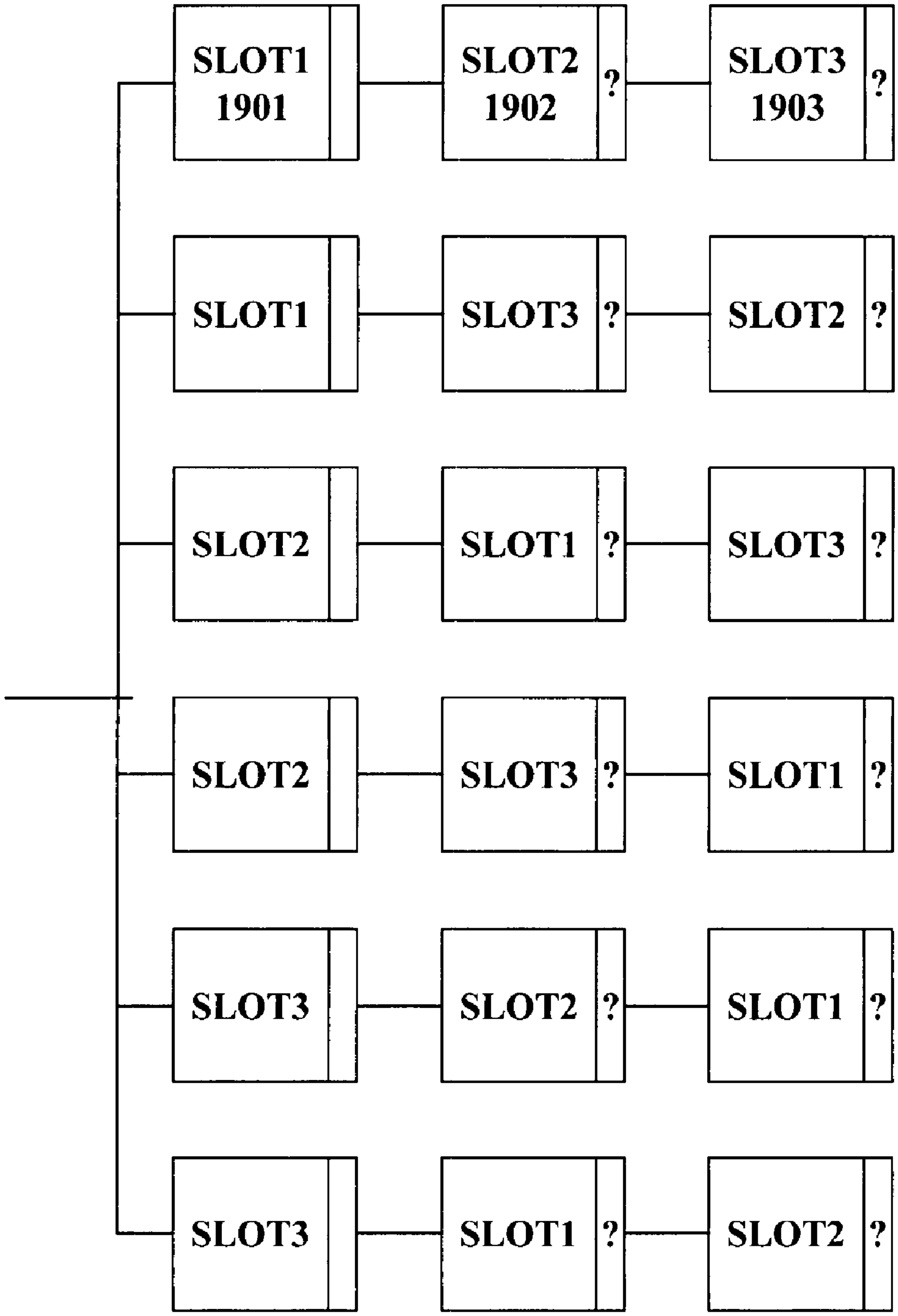
FIG. 19 illustrates a possible grammar for an exchange with three slots.

During a primary user turn, the system allows the user to provide values for one or more enabled slots. The grammar for the turn should thus be flexibly configured to recognize various flexible combinations of slots. For example, FIG. 19 illustrates a possible grammar for an exchange with three slots. Each branch of the diagram represents a grammar rule that could match the user's utterance. The grammars for slots 1, 2, and 3 are represented by reference numbers 1901, 1902, 1903, respectively. The postfix operator "?" applied to each of the grammars 1902, 1903 corresponding to slots 2 and 3 in the first branch indicates that slots 2 and 3 are optional such that in this first branch the user's utterance contains a value for slot 1, optionally a value for slot 2, and, if there is a value for slot 2, optionally a value for slot 3. Note that an application may restrict the allowed combination of slots (such as a slot having to come before another) depending on the norms of the language used and the context of a particular exchange.

Figure 20:
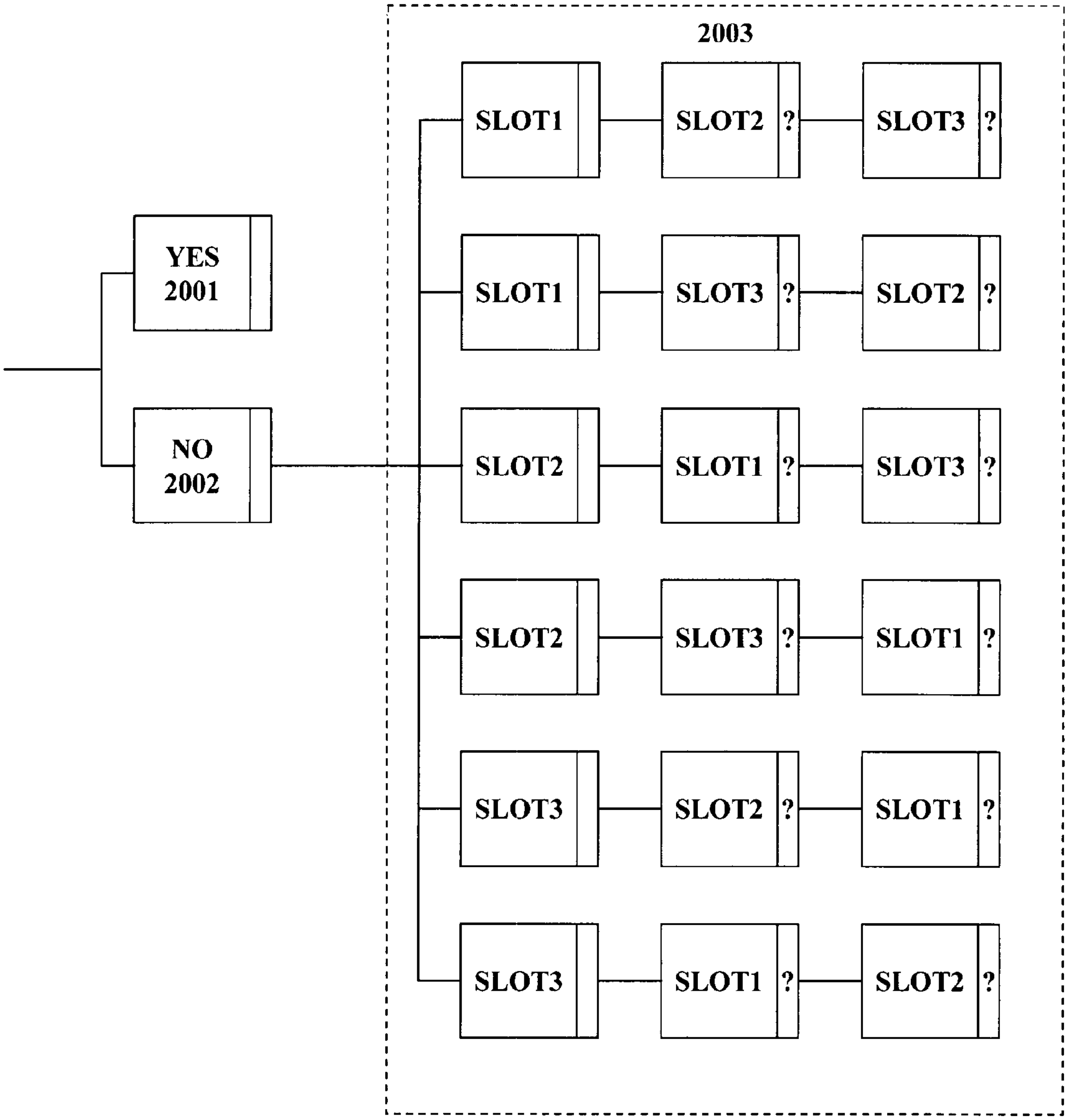
FIG. 20 illustrates a possible grammar for a confirmation exchange that includes accept and cancel grammars as well as grammars for the three slots being confirmed.

During a confirmation turn, the system allows the user not only to accept or cancel the confirmation, but also to provide corrected values. The grammar for a confirmation turn should thus be constructed to include the accept and cancel grammars as well as grammars for the slots being confirmed, an example of which is shown in FIG. 20. The accept grammar 2001 contains a set of phrases that express an affirmative response, such as "yes," "that's right," and "correct." The cancel grammar 2002 contains a set of phrases that express a negative response, such as "no," "that's wrong" and "incorrect." If the cancel grammar is present, an optional correction grammar 2003 is included which recognizes new values for the slots being cancelled.

While the exemplary embodiments of the present invention are described and illustrated herein, it will be appreciated that they are merely illustrative and that modifications can be made to these embodiments without departing from the spirit and scope of the invention. For example, although the multi-slot systems and methods described herein are well suited for voice interactions using speech recognition systems, the multi-slot systems and methods may also be adapted for use with text-based multi-slot interactions such as an interactive Internet-based multi-slot dialog. Thus, the scope of the invention is intended to be defined only in terms of the following claims as may be amended, with each claim being expressly incorporated into this Description of Specific Embodiments as an embodiment of the invention.

What is claimed is:

1. A computer readable medium having stored thereon a plurality of instructions, said plurality of instructions when executed by a processor, cause the processor to:

enable at least one unfilled slot in a segment of slots;

output a primary header prompt for eliciting values for a prompted slot set from the user, the prompted slot set including at least one enabled slot in the segment;

receive a primary user response, the primary user response containing a value for each slot in a response slot set, the response slot set including at least one slot in the segment;

process the primary user response to determine at least one possible recognition value for each slot contained in the primary user response, each slot contained in the primary user response being either a member of the prompted slot set or a remaining unfilled slot in the segment that is a non-member of the prompted slot set;

fill each slot contained in the primary user response with a matched value selected from the corresponding at least one possible recognition value; and repeat the outputting, receiving, processing and filling for any unfilled slots in the segment until all slots in the segment of slots are filled.

2. The computer readable medium of claim 1, having stored thereon additional instructions, said additional instructions, when executed by the processor, cause the processor to:

perform turns to at least one of confirm and clarify the matched slot values for slots contained in the primary user response.

3. The computer readable medium of claim 2, wherein the at least one of confirm and clarify is selected from the group consisting of silently accept a best match, passively confirm the best match, actively confirm the best match, disambiguate among the best matches, and notify the user of a non-recognition.

4. The computer readable medium of claim 3, wherein the at least one of confirm and clarify is selected based on the number of possible recognition values for the slots in the primary user response and a corresponding confidence level for each of the possible recognition values.

5. The computer readable medium of claim 3, wherein when the at least one of confirm and clarify is an active confirmation, the performing turns includes recognizing a user confirmation response as one of a confirmation, a cancellation, and a cancellation and correction, and wherein when the user confirmation response is a cancellation and correction, the correction is processed by processing the correction to determine at least one possible recognition value for each slot contained in the correction.

6. The computer readable medium of claim 3, wherein when the at least one of confirm and clarify is a passive confirmation, the performing turns includes recognizing a user passive confirmation response as one of a response to a next primary header prompt, a confirmation, a cancellation, and a cancellation and correction, and wherein when the user passive confirmation response is a cancellation and correction, the correction is processed by processing the correction to determine at least one possible recognition value for each slot contained in the correction.

7. The computer readable medium of claim 1, wherein the processing of the primary user response includes applying grammar rules to facilitate recognition of possible values for a corresponding slot.

8. The computer readable medium of claim 1, wherein the outputting the primary header prompt depends on the set of unfilled segments.

9. The computer readable medium of claim 1, wherein the outputting and the receiving is one of text-based and speech-based.

* * * * *